(12) United States Patent
Montgomery

(10) Patent No.: US 8,380,949 B2
(45) Date of Patent: Feb. 19, 2013

(54) MANAGING WRITE OPERATIONS TO AN EXTENT OF TRACKS MIGRATED BETWEEN STORAGE DEVICES

(75) Inventor: David Montgomery, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/784,427

(22) Filed: May 20, 2010

(65) Prior Publication Data

US 2011/0286123 A1 Nov. 24, 2011

(51) Int. Cl.
G06F 12/02 (2006.01)
(52) U.S. Cl. .......................................... 711/161; 711/117
(58) Field of Classification Search .................. 711/117, 711/161
See application file for complete search history.

(56) References Cited

U.S. PATENT DOCUMENTS

| | | | |
|---|---|---|---|
| 5,337,275 A | 8/1994 | Garner | |
| 5,459,850 A | 10/1995 | Clay et al. | |
| 5,720,029 A * | 2/1998 | Kern et al. | 714/20 |
| 5,742,934 A | 4/1998 | Shinohara | |
| 7,356,641 B2 | 4/2008 | Venkiteswaran | |
| 2002/0147862 A1 | 10/2002 | Traut et al. | |
| 2007/0050575 A1* | 3/2007 | Uratani et al. | 711/162 |
| 2009/0052311 A1 | 2/2009 | Sanvido | |
| 2009/0094433 A1 | 4/2009 | Thomas et al. | |
| 2009/0164705 A1 | 6/2009 | Gorobets | |
| 2009/0300277 A1 | 12/2009 | Jeddeloh | |
| 2010/0082765 A1* | 4/2010 | Murase | 709/213 |
| 2010/0103549 A1* | 4/2010 | Murayama et al. | 360/15 |

FOREIGN PATENT DOCUMENTS

| | | |
|---|---|---|
| EP | 1679585 | 5/2009 |
| WO | 2007089502 | 8/2007 |

OTHER PUBLICATIONS

International Patent Search Report and Written Opinion dated Aug. 4, 2011 for Serial No. PCT/EP2011/057398 filed May 9, 2011.
D. Meister, "dedupv1: Improving Deduplication Throughout using Solid State Drives (SSD)", IEEE, 2010, pp. 1-6.

(Continued)

Primary Examiner — Jared Rutz
(74) Attorney, Agent, or Firm — David W. Victor; Konrad Raynes Davda & Victor LLP

(57) ABSTRACT

Provided are a computer program product, system, and method for managing write operations to an extent of tracks migrated between storage device. An operation is processed to migrate an extent of tracks from the second storage to the first storage. A determination is made as to whether an extent object exists for the extent to migrate. The extent object exists if the extent was previously migrated from the first storage to the second storage at a previous time. The extent object includes for each track a write indicator indicating whether the track was updated in the second storage since the previous time when the extent was previously migrated to the second storage. In response to determining that the extent object exists, a determination is made of the tracks in the extent having the write indicator indicating that the track was updated in the second storage since the previous time. The data for the determined tracks is copied from the second storage to free locations in the first storage. For each determined track, the entry for the determined track in the extent object is updated to indicate the free location to which the data for the track was copied as an active address for the track.

22 Claims, 5 Drawing Sheets

OTHER PUBLICATIONS

U.S. Appl. No. 13/455,433, filed Apr. 25, 2012, entitled "Managing Write Operations to an Extent of Tracks Migrated Between Storage Devices" by inventor D. Montgomery.

Preliminary Amendment filed U.S. Appl. No. 13/455,433, filed Apr. 25, 2012, entitled "Managing Write Operations to an Extent of Tracks Migrated Between Storage Devices" by inventor D. Montgomery.

* cited by examiner

FIG. 2

Extent Object

| Track ID | Modify Indicator | Active Address | Active Checksum | Previous Version Address | Previous Version Checksum | ... | Previous Version Address | Previous Version Checksum |
|---|---|---|---|---|---|---|---|---|
| 52 | 54 | 56 | 58 | 60₁ | 62₁ | | 60ₙ | 62ₙ |

| Track ID | Modify Indicator | Active Address | Active Checksum | Previous Version Address | Previous Version Checksum | ... | Previous Version Address | Previous Version Checksum |
|---|---|---|---|---|---|---|---|---|
| 1 | | | | | | | | |
| 2 | | | | | | | | |
| 3 | | | | | | | | |
| ... | | | | | | | | |
| n | | | | | | | | |

80

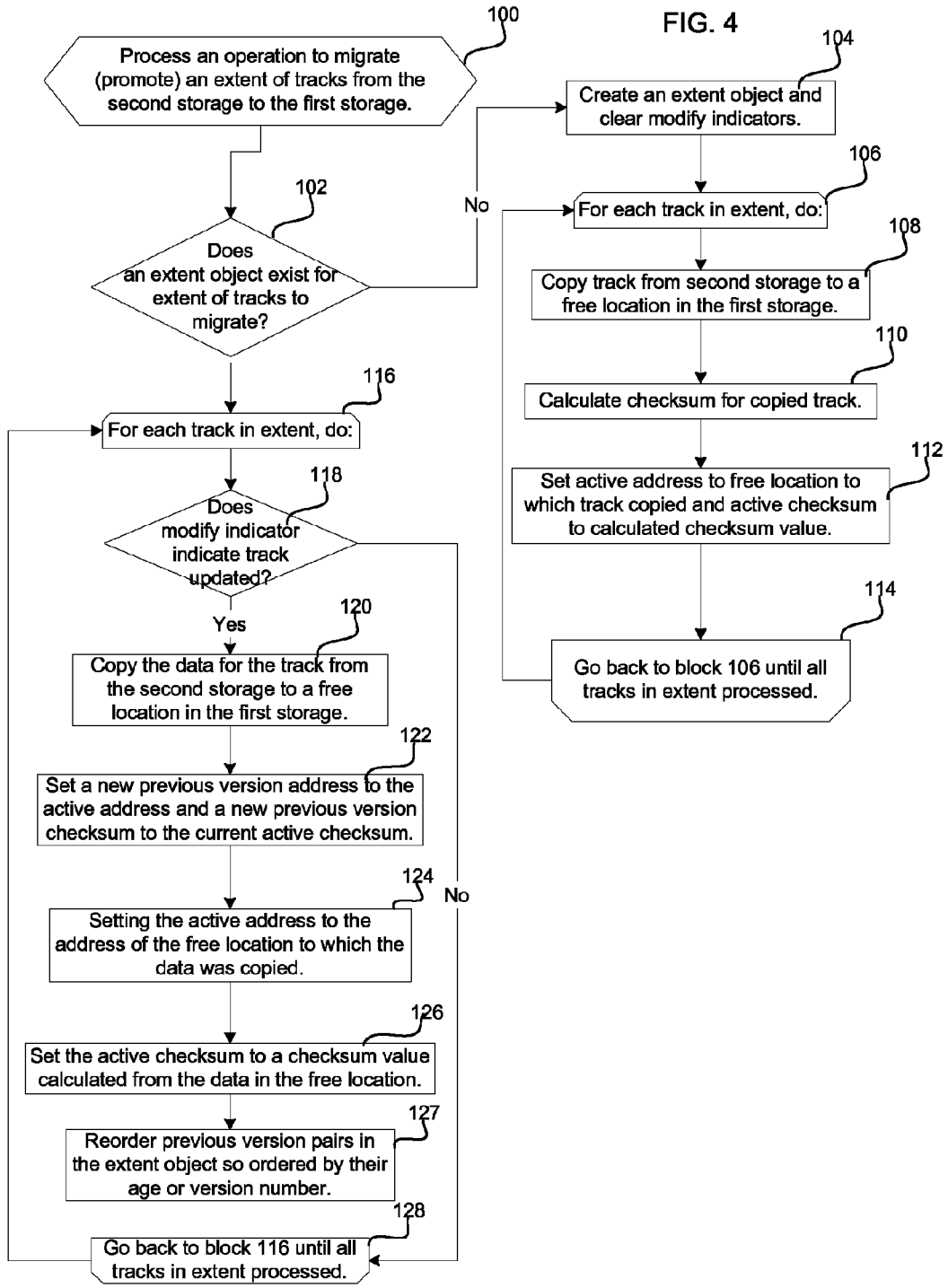

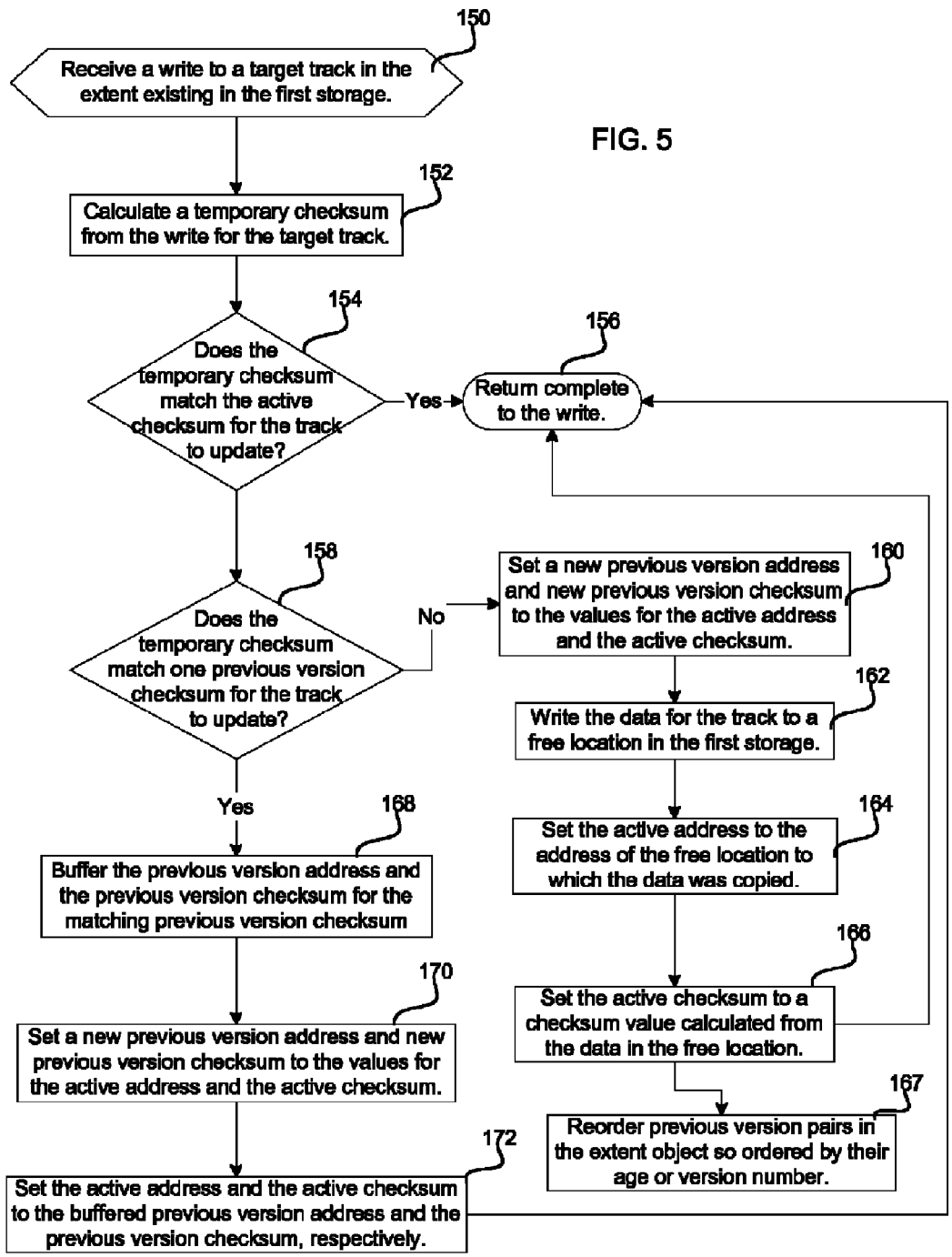

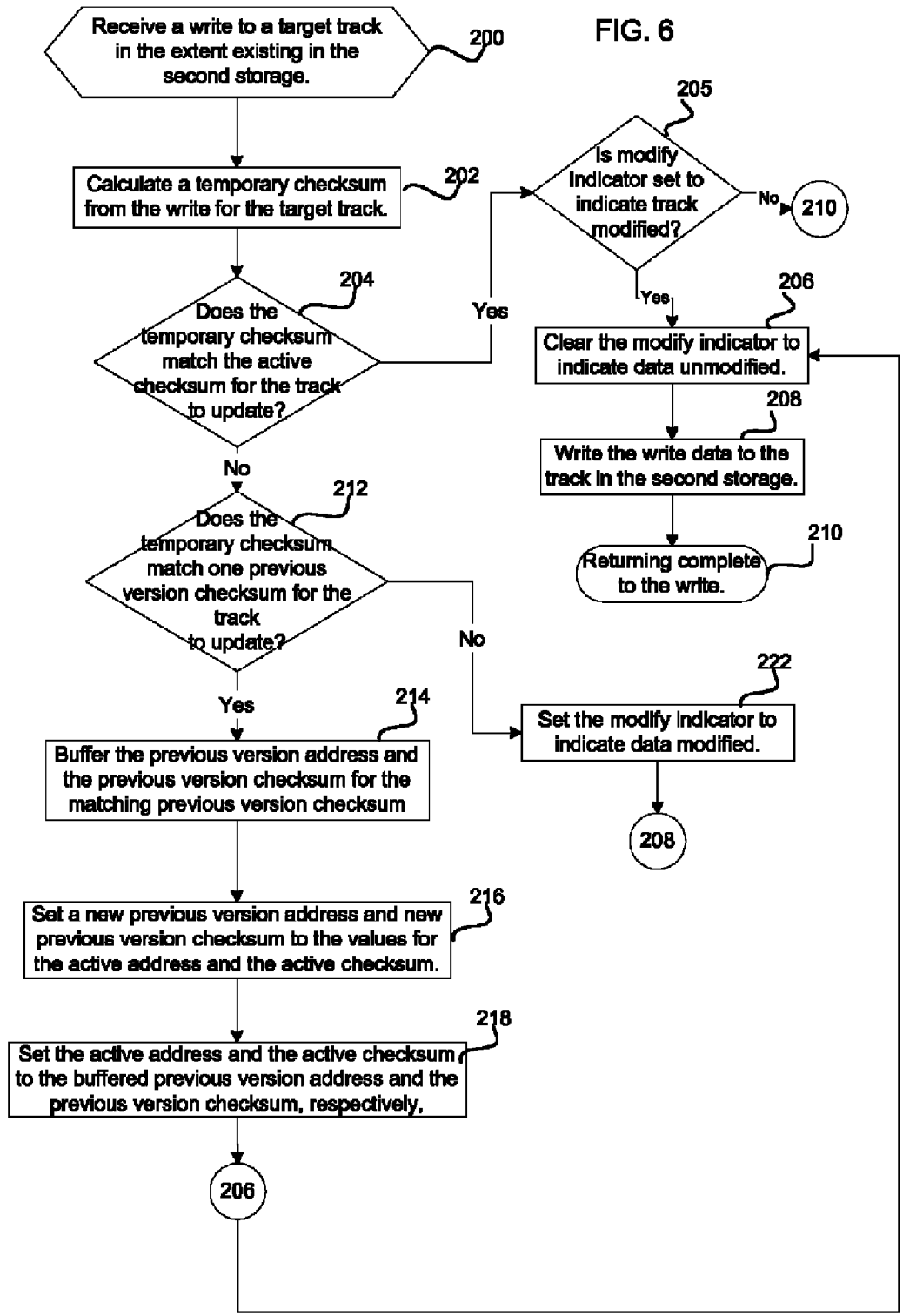

MANAGING WRITE OPERATIONS TO AN EXTENT OF TRACKS MIGRATED BETWEEN STORAGE DEVICES

BACKGROUND OF THE INVENTION

1. Field of the Invention

The present invention relates to a method, system, and computer program product for managing write operations to an extent of tracks migrated between storage devices.

2. Description of the Related Art

In a hierarchical storage environment, extents of tracks may be migrated between different tiers of storage devices, such as hard disk drives, solid state storage devices, etc., depending on the characteristics of the storage devices and the frequency of access and priority of data. For instance, more frequently accessed extents and/or higher priority extents may be migrated to a faster access tier from a slower access tier, and less frequently accessed extents and/or lower priority extents may be migrated to a faster access tier. When migrating extents, all the data from the extent may be copied over from one storage device to another.

There is a need in the art for improved techniques for migrating extents of tracks between storage devices.

SUMMARY

Provided are a computer program product, system, and method for managing write operations to an extent of tracks migrated between storage device. An operation is processed to migrate an extent of tracks from the second storage to the first storage. A determination is made as to whether an extent object exists for the extent to migrate. The extent object exists if the extent was previously migrated from the first storage to the second storage at a previous time. The extent object includes for each track a write indicator indicating whether the track was updated in the second storage since the previous time when the extent was previously migrated to the second storage. In response to determining that the extent object exists, a determination is made of the tracks in the extent having the write indicator indicating that the track was updated in the second storage since the previous time. The data for the determined tracks is copied from the second storage to free locations in the first storage. For each determined track, the entry for the determined track in the extent object is updated to indicate the free location to which the data for the track was copied as an active address for the track.

BRIEF DESCRIPTION OF THE DRAWINGS

FIG. 2 illustrates an embodiment of an entry in an extent object.

FIG. 3 illustrates an embodiment of an extent object as an extent table.

FIG. 4 illustrates an embodiment of operations to migrate an extent from a second storage to a first storage.

FIG. 5 illustrates an embodiment of operations to process a write request to a track in an extent existing in the first storage.

FIG. 6 illustrates an embodiment of operations to process a write request to a track in an extent existing in the second storage.

DETAILED DESCRIPTION

Figure 1:
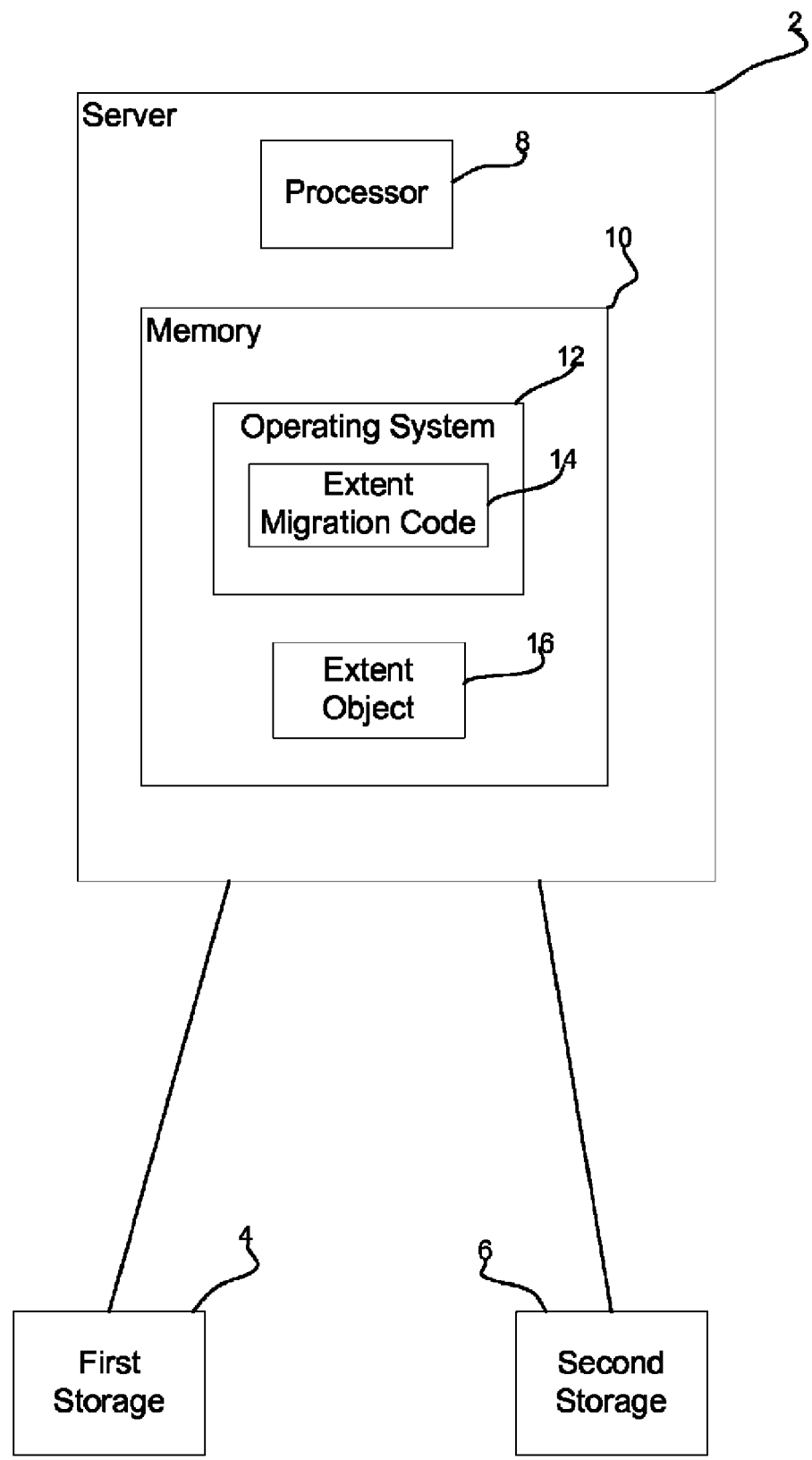
FIG. 1 illustrates an embodiment of a computing environment.

FIG. 1 illustrates an embodiment of a server 2 storing tracks of data in a first storage 4 and a second storage 6. The server 2 includes a processor 8 comprising one or more processor devices and a memory 10 in which an operating system 12 is loaded to be executed by the processor 8. The operating system 12 includes extent migration code 14 to manage the migration of an extent of tracks represented by an extent object 16 between the first 4 and second 6 storages. The extent of tracks may be active in one of the first storage 4 or second storage 6, and may be migrated between the first 4 and second 6 storages.

The server 2 may communicate with the first 4 and second storages 6 over a network, via separate cables through a storage interface, in a loop architecture, etc. The first 4 and second 6 storages may comprise different types of storage devices, such as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The memory 8 may comprise one or more volatile or non-volatile memory devices. The extent migration code 14 may alternatively be implemented as application code external to the operating system 12 or may be implemented with hardware logic, such as an Application Specific Integrated Circuit (ASIC), or as a programmable processor executing code in a computer readable storage medium.

In one embodiment, the first 4 and second 6 storages may comprise storage tiers in a hierarchical arrangement of storage devices, where tiers define storage based on characteristics such as speed of their Input/Output (I/O) access profile, redundancy, etc. For instance, the first storage 4 may comprise a high speed storage, such as an SSD or RAM drive, and the second storage 6 may comprise a slower access storage, such as a hard disk drive or tape medium. The operating system 12 may call the extent migration code 14 to migrate extents that are not frequently accessed and/or having lower priority from the first storage 4 to the second storage 6 and migrate more frequently accessed and/or higher priority extents of tracks from the second storage 6 to the first storage 4 employing hierarchical management storage techniques known in the art. Data characteristics other than or in addition to the frequency of data access and priority of the data may be used to determine whether to migrate extents between higher and lower tier storage devices in the storage hierarchy.

In certain embodiments, the extent object 16 identifies tracks that are stored contiguously in the second storage 6, which is advantageous in embodiments where the second storage 6 comprises a storage device that has improved read/write access for tracks stored contiguously in the media, such as a hard disk drive and a tape drive. However, the data for the tracks in the extent may not be contiguously stored in the first storage, which may comprise a storage device that does not experience improved access for contiguously stored tracks, such as the case with a solid state storage device (SSD) or Random Access Memory (RAM) drive.

The extent object 16 includes entries for each track managed in one extent. Each track may comprise a same size single unit of data. The server 2 may maintain multiple extent objects 16 for each separate extent the server 2 manages in the first 4 and second 6 storages. Further, there may be additional storage devices, such that the server 2 may manage the migration of an extent of tracks among more than two storages, where the different storages may have different I/O access profiles.

FIG. 2 illustrates an embodiment of an entry 50 in the extent object 16 providing information on one track in an extent. A track identifier (ID) 52 identifies a track in the extent. A modify indicator 54 indicates whether the track was updated in the second storage 6 since a previous time when the extent and track were previously migrated from the first storage 4 to the second storage 6, thus indicating whether the first storage 4 has the most recent version of the track while the track and extent exist on the second storage 6. An active address 56 indicates an address in the first storage 4 having a most recent version of the track in the first storage 6. An active checksum 58 comprises a checksum value calculated from the data at the active address 56. The checksum value may be calculated using checksum or hash algorithms known in the art to determine a unique or likely unique representation of the data. If the modify indicator 52 indicates that the track was updated in the second storage 6 and that the first storage 4 does not have the most recent version of the data, then the data identified by the active address 56 may not comprise an active version, but a previous version due to the more current update at the second storage 6.

In certain embodiments, data updates may be written to a new free location in the first storage 4. In such case, the extent entry 50 for the track would maintain a previous version address $60_1 \ldots 60_n$ for each previous version a ... n of the track stored in the first storage 4 and previous version checksum $62_1 \ldots 62_n$ calculated from the previous version of the track. The order of the previous version addresses $60_1 \ldots 60_n$ in the extent table 80 may indicate the age of the previous versions, where the newest previous version address is the first, $60_1$, and the oldest is the last, $60_n$. The server 2 may limit the number of versions of data maintained in the first storage 4 based on various factors, such as available space, predefined number of versions limit, predefined space available to store previous versions, etc.

In embodiments where the first storage 4 comprises an SSD, newly written data is written to a new physical location in the first storage 4 as part of a process called wear leveling to distribute writes across the storage device when updating a frequently accessed logical address, which prolongs the life of a solid state storage device. Continually writing to the same physical location of a solid state device can wear out the storage blocks in the solid state storage device.

FIG. 3 illustrates an example of an extent object implemented as an extent table 80 having a row for each track with columns providing the information for the extent object.

FIG. 4 illustrates an embodiment of operations implemented in the extent migration code 16 to migrate or promote an extent from the second storage 6 to the first storage 4. Upon processing the request to migrate the extent (at block 100), a determination is made (at block 102) as to whether an extent object 16 exists for the extent of tracks to migrate. If not, then the extent migration code 14 proceeds to block 104 to create a new extent object 16 for the extent and clear the modify indicator 54 for each extent entry 50 (FIG. 2) to indicate that the data has not been modified in the second storage 2. For each track in the extent 16, the extent migration code 14 performs a loop (at blocks 106-114) of operations for each track in the extent. For each track, the track is copied (at block 108) from the second storage 6 to a free location in the first storage 4. The extent migration code 14 calculates (at block 110) a checksum for the copied track and sets (at block 112) the active address 56 for the track to the free location in the first storage 4 to which the track was copied and sets the active checksum 58 to the calculated checksum value. The operations at blocks 104-114 may be performed the first time the extent is promoted and migrated to the first storage 4.

If (at block 102) an extent object 16 already exists for the extent being promoted, then the extent was previously migrated from the first storage 4 to the second storage 6 and a loop is performed at blocks 116 through 128 for each track in the extent to migrate or promote from the second storage 6 to the first storage 4. If (at block 118) the modify indicator 54 for the track being considered indicates that the track was not updated while on the second storage 6, then no action is performed on the track and the data is not copied over because the data has not changed. If (at block 118) the modify indicator 54 for the track indicates the track was modified, then the data for the track is copied (at block 120) from the second storage 6 to a free location in the first storage 4. A new previous version address for the track is set to the current active address 56, making the current data for the track a previous version, and a new previous version checksum for the track is set to the current active checksum 58. Then the active address 56 is set (at block 124) to the address of the free location to which the data was copied and the active checksum 58 is set (at block 126) to a checksum value calculated from the data copied to the free location. The previous version pairs, previous version addresses $60_1 \ldots 60n$ and previous version checksums $62a \ldots 62n$, are then reordered (at block 127) so the previous version information is ordered by the age or version number of the previous version.

In one embodiment where the extent object 16 comprises an extent table 80 (FIG. 3), to perform the reorder operation of block 127 and make the current active data and checksum a previous version, the extent migration code 14 may shift the columns for the current previous versions $60_1 \ldots 60n$ and $62a \ldots 62n$ to the right two columns to overwrite and occupy columns for the previous versions 2 ... n+1, and then copy the current active address 56 and the current active checksum 58 to a new most current previous version address $60_1$ and $62_1$. In this way, the current version address 56 and checksum 58 is made the most recent previous version to make room in the active fields 56 and 58 for the updated data copied to the free location. In alternative embodiments, the ordering may be indicated by pointers or other information indicating an ordering of the previous versions.

With the operations of FIG. 4, only tracks that have changed in the second storage 6 since the extent was migrated or demoted from the first storage 4 to the second storage 6 are copied over to the first storage 4 when migrating or promoting the extent from the second storage 6 to the first storage 4. In embodiments where the first storage 4 comprises an SSD, this described operations provide for wear leveling because new data is written to a new location and unnecessary writes to the first storage 4 are avoided because data that has not been modified in the second storage 6 since the previous migration are not copied to the first storage 4.

FIG. 5 illustrates an embodiment of operations performed by the operating system 12 to handle a write to a track in an extent that exists in the first storage 4. Upon receiving the write, the operating system 12 (or some other code) calculates (at block 152) a temporary checksum from the write for the target tracks. If (at block 154) the temporary checksum matches the active checksum 58 for the track, then complete is returned to the write request because the data at the active address 56 for the track is the same as the data to write. In such case, the data does not have to be written to the first storage 4, which reduces wear leveling in embodiments where the first storage comprises an SSD or other type of device whose life is reduced by continual writing to the same location. If (at block 154) the temporary checksum does not match the active checksum 58, then the operating system 12 determines (at block 158) whether the temporary checksum matches one of the previous version checksums $62_1 \ldots 62_n$. There may be zero or more previous version addresses and checksums. If there is a match, then the operating system 12 performs operations 160-166 to use data for a previous version at one of the previous version addresses $60_1 \ldots 60_n$ because the data for a previous version matches the data to write. At block 160, the operating system 12 sets (at block 160) a new previous version address and new previous version checksum to the values for the active address and the active checksum. This new previous version address and the new previous version checksum become the most current previous version address $60_1$ and checksum $62_1$. The operating system 12 writes (at block 162) the write data for the track to a free location in the first storage and sets (at block 164) the active address 56 to the address of the free location to which the data was copied and sets (at block 166) the active checksum 58 to a checksum value calculated from the data in the free location. The previous version pairs, previous version addresses $60_1 \ldots 60n$ and previous checksums $62a \ldots 62n$, are then reordered (at block 167) so the previous version information is ordered by the age or version number of the previous version.

In embodiments where the extent object 16 comprises an extent table 80 (FIG. 3), after creating the new previous version address and previous version checksum, to perform the reorder operation of block 167, the operating system 12 may shift all the current previous version addresses $60_1 \ldots 60_n$ and checksums $62_1 \ldots 62_n$ two columns to the right in the table, to overwrite the column data and make them the previous version addresses $60_2 \ldots 60_{n+1}$ and checksums $62_2 \ldots 62_{n+1}$ and then the created new previous version address and checksum become previous version address $60_1$ and checksum $62_1$. In alternative embodiments, the ordering may be indicated by pointers or other information indicating an ordering of the previous versions.

If (at block 158) the temporary checksum matches a determined one of the previous version checksums $62_1 \ldots 62_n$, then the operating system 12 buffers (at block 168) the determined previous address and the previous checksum for the matching previous checksum. The operating system 12 sets (at block 170) a new previous version address and new previous version checksum to the values for the current active address 56 and the active checksum 58, to make the current active address and checksum the most current previous version. After performing block 170, the operating system 12 then sets (at block 172) the active address 56 and the active checksum 58 to the buffered previous version address and the previous version checksum, respectively. In embodiments where the extent object 16 comprises an extent table 80 (FIG. 3), after making one previous version address, e.g., $60_i$ and previous version checksum, e.g., $62_i$, the current active versions 56 and 58 at blocks 168-172, the operating system 12 may then shift all columns of previous version addresses $60_{i+1} \ldots 60_n$ and previous version checksums $62_{i+1} \ldots 62_n$ following the matching buffered previous version address $60_i$ and checksum $62_i$ to the left two columns in the table 80 to overwrite the columns which the matching buffered previous version address $60_i$ and checksum $62_i$ copied to the active fields 56 and 58, occupied.

With the described embodiments of FIG. 5, the operating system 12 tries to use the current active address 56 and 58 or one previous version address $60_1 \ldots 60_n$ and checksum $62_1 \ldots 62_n$ for the new active address 56 and checksum 58 to avoid having to write the data to the first storage 4. In this way, the operating system 12 is reusing the data already present in the first storage 4 for the new write data. In embodiments where the first storage 4 comprises an SSD, using the active or previous version data for the write to avoid writing avoids wear and prolongs the life of the SSD.

FIG. 6 illustrates an embodiment of operations implemented in the operating system 12 code (or other component) to process a write directed to a target track in an extent existing in the second storage 6. The extent object 16 would already have been created when the operations of FIG. 6 are initiated. In response (at block 200) to receiving the write, the operating system 12 calculates (at block 202) a temporary checksum from the write for the target track. If (at block 204) the temporary checksum matches the active checksum 58 for the track and If (at block 205) the modify indicator 54 is set to indicate that the track in the second storage 6 was previously modified such that the modification was not reflected in the extent object 16, then the modify indicator 54 is cleared (at block 206), because the first storage 4 track will have the track modified in the second storage 6. The write data is written (at block 208) to the track in the second storage and complete is returned (at block 210) to the write request. In such case, the extent object 16 does not have to be updated because the data at the active address 56 for the track in the first storage 4 is the same as the data written t the second storage 6. If (at block 205) the modify indicator 54 is not set, then control proceeds to block 210 to not write anything because the active or most recently written data in both the first storage 4 and second storage 8 have data already matching the data to write.

If (at block 204) the temporary checksum does not match the active checksum 58, then the operating system 12 determines (at block 212) whether the temporary checksum matches one of the previous version checksums $62_1 \ldots 62_n$. There may be zero or more previous version addresses and checksums. If (at block 212) there is a match, then the operating system 12 performs operations 214-218 to use a track for a previous version at one of the previous version addresses $60_1 \ldots 60_n$ because the track for a determined previous version in the first storage 6 matches the data to write to the track in the second storage 6. The operating system 12 buffers (at block 214) the determined previous version address, e.g., $60_i$, and the previous version checksum, e.g., $62_i$, for the matching previous version checksum $62_i$. The operating system 12 sets (at block 216) a new previous version address and new previous version checksum to the values for the current active address 56 and the active checksum 58. After performing block 216, the operating system 12 sets (at block 218) the active address 56 and the active checksum 58 to the buffered previous version address $60_i$ and the previous version checksum $62_i$, respectively. The operating system 12 clears (at block 206) the modify indicator 54 to indicate the track is unmodified because the first storage 4 has the data modified at the second storage 6. Control then proceed to block 206 to block 208 to complete the write to the second storage 6.

In embodiments where the extent object 16 comprises an extent table 80 (FIG. 3), after making one previous version address, e.g., $60_i$ and previous version checksum, e.g., $62_i$, the current active versions 56 and 58 at blocks 212-216, the operating system 12 may then shift all columns of previous version addresses $60_{i+1}$ and previous version checksums $62_{i+1}$ following the matching buffered previous version address $60_i$ and checksum $62_i$ to the left two columns in the table 80 to overwrite the columns which the matching buffered previous version address $60_i$ and checksum $62_i$ occupied.

If (at block 212) the temporary checksum does not match one previous version checksum, then the modify indicator 42 is set (at block 222) to indicate that the data has been modified in the second storage 6 and control proceeds to block 208 to complete the write to the second storage 6. Setting the modify indicator 54 indicates that the first storage 6 may not have the data written to the second storage 6. In such case, the data in the first storage 6 at the active address 56 is not "active data", because the data for the track has since been modified in the second storage 6, and the track data at the active address 58 may be for a most recent previous version. Thus, when the modify indicator 54 is set, the active address 56 and active checksum 56 information may not be for actual active data for the track.

With the described embodiments of FIG. 6, the operating system 12 tries to use the current active address 56 and 58 or one previous version address $60_1 \ldots 60_n$ and checksum $62_1 \ldots 62_n$ for the new active address 56 and active checksum 58 in the first storage 4 if the preexisting data for the track in the first storage 4 matches the data to write to the second storage 6. By updating the extent object 16 to reflect that the first storage 4 has the data written to the second storage 6, the first storage 4 does not have to subsequently be updated with the write data to the track in the second storage 6 when migrating the extent having the modified track from the second storage 6 back to the first storage 4 because the modify indicator 54 is cleared. In embodiments where the first storage 4 comprises an SSD, using the active or previous version of the track in the first storage 4 for the write to the second storage 6 avoids having to write to the first storage during a later migration from the second storage 6 to the first storage 4. Avoiding writes to the first storage 4 reduces wear and prolongs the life of the SSD.

In the embodiments of FIGS. 5 and 6, in the event that there is no extent object maintained for the track being written in the first 4 or second storage 6, the write may be allowed to proceed without performing any further action. Further, if there are multiple tracks to write for a write operation, then the operations of FIGS. 5 and 6 would be performed for each track to write.

Described embodiments provide techniques for reducing the number of writes to the first storage when migrating an extent from a second storage to the first storage, when performing a write to an extent existing in the first storage, and when performing a write to the second storage. In embodiments where the first storage comprises an SSD or other storage device whose storage life is reduced by continual updates to the same location, the described embodiments reduce wear and prolong the life of the storage device.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the server of FIG. 1 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the server of FIG. 1 may provide clients, and other servers and software and/or hardware components in the networked cloud, with storage and data processing services. The server 2 may provide reliable storage services and access to the storages 4 and 6 to meet quality of service requirements for customers in the cloud, including clients requiring storage and other servers providing storage services to clients. The server 2 may communicate with clients to provide storage services for the storages 4 and 6 through a web interface or other application programming interface.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for managing data in a first storage and a second storage, the computer program product comprising a non-transitory computer readable storage medium having computer readable program code embodied therein that executes to perform operations, the operations comprising:
   processing an operation to migrate an extent of tracks from the second storage to the first storage;
   determining whether an extent object exists for the extent to migrate, wherein the extent object exists if the extent was previously migrated from the first storage to the second storage at a previous time, and wherein the extent object includes for each track a write indicator indicating whether the track was updated in the second storage since the previous time when the extent was previously migrated to the second storage; and
   in response to determining that the extent object exists, performing:
      determining the tracks in the extent having the write indicator indicating that the track was updated in the second storage since the previous time;
      copying the data for the determined tracks from the second storage to free locations in the first storage; and
      for each determined track, updating the entry for the determined track in the extent object to indicate the free location to which the data for the track was copied as an active address for the track.

2. The computer program product of claim 1, wherein the extent object maintains information for previous versions of the data for the track in the first storage, wherein for each track having at least one previous version, the entry for the track includes a previous version address for each previous version indicating a location in the first storage of the data for the previous version of the track, wherein the operations further comprise:
   for each determined track, setting a new previous version address to the active address for the track prior to updating the active address to indicate the free location to which the data from the second storage was copied.

3. The computer program product of claim 1, wherein the first storage comprises a solid state storage device and wherein the second storage comprises a storage device type having a slower Input/Output access profile than the solid state storage device.

4. The computer program product of claim 1, wherein the second storage stores the tracks in the extent contiguously, and wherein modified tracks in the second storage are copied to non-contiguous locations in the first storage with respect to unmodified tracks in the extent, and wherein unmodified data in the second storage is not copied to the first storage as part of the migration of the extent from the second storage to the first storage.

5. The computer program product of claim 1, wherein each entry includes an active checksum value calculated from the track data identified in the active address and for at least one previous version of the track maintained in the first storage, a previous version address of the previous version of the track in the first storage and a previous version checksum value calculated from the track data identified in the previous version address, wherein the operations further comprise:
 receiving a write to a target track in the extent existing in the first storage;
 calculating a temporary checksum from the write for the target track;
 determining whether the temporary checksum matches the active checksum or one of the at least one previous version checksums in the entry in the extent object for the target track;
 using the active address or the previous version address and the corresponding active or previous version checksum that matches the temporary checksum for the active address and active checksum for the entry in the extent object for the target track; and
 writing the write to the target track to a free location in the first storage in response to determining that the temporary checksum does not match one of the active checksum or any of the at least one previous version checksum.

6. The computer program product of claim 5, wherein the write to the target track is not written to the first storage in response to determining that the temporary checksum matches one of the active checksum or one of the at least one previous version checksum.

7. The computer program product of claim 5, wherein using the active address or the previous version address and the corresponding checksum that matches the temporary checksum comprises:
 returning complete to the write in response to determining that the temporary checksum matches the active checksum or one of the at least one previous version checksum; and
 in response to determining that the temporary checksum matches one of the at least one previous version checksum, performing:
  buffering the previous version address and the previous version checksum for the matching previous version checksum;
  setting a new previous version address and new previous version checksum to the values for the active address and the active checksum; and
  setting the active address and the active checksum to the buffered previous version address and the previous version checksum, respectively, after setting the new previous version address and the new previous version checksum.

8. The computer program product of claim 1, wherein each entry includes an active checksum value calculated from the track data identified in the active address and for at least one previous version of the track maintained in the first storage, a previous version address of the previous version of the track in the first storage and a previous version checksum calculated from the track data identified in the previous version address, wherein the operations further comprise:
 receiving a write to a target track in the extent existing in the second storage;
 calculating a temporary checksum from the write for the target track;
 determining whether the temporary checksum matches the active checksum or one of the at least one previous version checksum in the entry in the extent object for the target track; and
 using the active address or the previous version address and the corresponding active or previous version checksum that matches the temporary checksum for the active address and active checksum for the entry in the extent object for the target track in response to determining the match.

9. The computer program product of claim 8, wherein the operations further comprise:
 setting the indicator in the entry for the target track in the extent object to indicate that the track was updated in the second storage in response to determining that the temporary checksum does not match one of the active checksum or one of the at least one previous version checksum, wherein the indicator indicates that the data for the target track at the active address in the first storage is not a most current version of the data for the track maintained in the second storage.

10. The computer program product of claim 8, wherein the operations further comprise:
 in response to determining that the temporary checksum matches one of the at least one previous version checksum, performing:
  buffering the previous version address and the previous version checksum for the matching previous version checksum;
  setting a new previous version address and new previous version checksum to the active address and the active checksum values, respectively; and
  setting the active address and the active checksum to the buffered previous version address and the buffered previous version checksum, respectively, after setting the new previous version address and the new previous version checksum.

11. The computer program product of claim 1, wherein each entry is comprised of a plurality of columns including an active checksum value in an active checksum column that is calculated from the track data identified in the active address in an active address column and for at least one previous version of the track maintained in the first storage, a previous version address column having an address of the previous version of the track in the first storage and a previous version checksum column having a checksum value calculated from the track data at the previous version address, wherein the operations further comprise:
 receiving a write to a target track in the extent existing in the first storage or the second storage;
 calculating a temporary checksum from the write for the target track;
 determining whether the temporary checksum matches one of the at least one previous version checksums in the entry in the extent object for the target track;

writing the previous version address and the corresponding previous version checksum that matches the temporary checksum to the active address column and the active checksum column for the entry in the extent object for the target track; and shifting any previous address columns and previous checksum columns that have an older version than a version of the previous version address and checksum written to the active address column and the active checksum column to overwrite the previous address column and the previous checksum column including the previous version address and the corresponding previous version checksum written to the active address column and the active checksum column.

12. A system in communication with a first storage and a second storage, comprising:

a processor;

a memory including code executed by the processor to perform operations, the operations comprising:

processing an operation to migrate an extent of tracks from the second storage to the first storage;

determining whether an extent object exists for the extent to migrate, wherein the extent object exists if the extent was previously migrated from the first storage to the second storage at a previous time, and wherein the extent object includes for each track a write indicator indicating whether the track was updated in the second storage since the previous time when the extent was previously migrated to the second storage; and in response to determining that the extent object exists, performing:

determining the tracks in the extent having the write indicator indicating that the track was updated in the second storage since the previous time;

copying the data for the determined tracks from the second storage to free locations in the first storage; and for each determined track, updating the entry for the determined track in the extent object to indicate the free location to which the data for the track was copied as an active address for the track.

13. The system of claim 12, wherein the extent object maintains information for previous versions of the data for the track in the first storage, wherein for each track having at least one previous version, the entry for the track includes a previous version address for each previous version indicating a location in the first storage of the data for the previous version of the track, wherein the operations further comprise:

for each determined track, setting a new previous version address to the active address for the track prior to updating the active address to indicate the free location to which the data from the second storage was copied.

14. The system of claim 12, wherein the first storage comprises a solid state storage device and wherein the second storage comprises a storage device type having a slower Input/Output access profile than the solid state storage device.

15. The system of claim 12, wherein each entry includes an active checksum value calculated from the track data identified in the active address and for at least one previous version of the track maintained in the first storage, a previous version address of the previous version of the track in the first storage and a previous version checksum value calculated from the track data identified in the previous version address, wherein the operations further comprise:

receiving a write to a target track in the extent existing in the first storage;

calculating a temporary checksum from the write for the target track;

determining whether the temporary checksum matches the active checksum or one of the at least one previous version checksums in the entry in the extent object for the target track;

using the active address or the previous version address and the corresponding active or previous version checksum that matches the temporary checksum for the active address and active checksum for the entry in the extent object for the target track; and writing the write to the target track to a free location in the first storage in response to determining that the temporary checksum does not match one of the active checksum or any of the at least one previous version checksum.

16. The system of claim 12, wherein each entry includes an active checksum value calculated from the track data identified in the active address and for at least one previous version of the track maintained in the first storage, a previous version address of the previous version of the track in the first storage and a previous version checksum calculated from the track data identified in the previous version address, wherein the operations further comprise:

receiving a write to a target track in the extent existing in the second storage;

calculating a temporary checksum from the write for the target track;

determining whether the temporary checksum matches the active checksum or one of the at least one previous version checksum in the entry in the extent object for the target track;

using the active address or the previous version address and the corresponding active or previous version checksum that matches the temporary checksum for the active address and active checksum for the entry in the extent object for the target track in response to determining the match.

17. The system of claim 12, wherein each entry is comprised of a plurality of columns including an active checksum value in an active checksum column that is calculated from the track data identified in the active address in an active address column and for at least one previous version of the track maintained in the first storage, a previous version address column having an address of the previous version of the track in the first storage and a previous version checksum column having a checksum value calculated from the track data at the previous version address, wherein the operations further comprise:

receiving a write to a target track in the extent existing in the first storage or the second storage;

calculating a temporary checksum from the write for the target track;

determining whether the temporary checksum matches one of the at least one previous version checksums in the entry in the extent object for the target track;

writing the previous version address and the corresponding previous version checksum that matches the temporary checksum to the active address column and the active checksum column for the entry in the extent object for the target track; and shifting any previous address columns and previous checksum columns that have an older version than a version of the previous version address and checksum written to the active address column and the active checksum column to overwrite the previous address column and the previous checksum column including the previous version address and the corresponding previous version checksum written to the active address column and the active checksum column.

18. The system of claim 12, wherein the second storage stores the tracks in the extent contiguously, and wherein modified tracks in the second storage are copied to non-contiguous locations in the first storage with respect to unmodified tracks in the extent, and wherein unmodified data in the second storage is not copied to the first storage as part of the migration of the extent from the second storage to the first storage.

19. The system of claim 15, wherein the write to the target track is not written to the first storage in response to determining that the temporary checksum matches one of the active checksum or one of the at least one previous version checksum.

20. The system of claim 15, wherein using the active address or the previous version address and the corresponding checksum that matches the temporary checksum comprises:
   returning complete to the write in response to determining that the temporary checksum matches the active checksum or one of the at least one previous version checksum;
   in response to determining that the temporary checksum matches one of the at least one previous version checksum, performing:
      buffering the previous version address and the previous version checksum for the matching previous version checksum;
      setting a new previous version address and new previous version checksum to the values for the active address and the active checksum; and
      setting the active address and the active checksum to the buffered previous version address and the previous version checksum, respectively, after setting the new previous version address and the new previous version checksum.

21. The system of claim 16, further comprising:
setting the indicator in the entry for the target track in the extent object to indicate that the track was updated in the second storage in response to determining that the temporary checksum does not match one of the active checksum or one of the at least one previous version checksum, wherein the indicator indicates that the data for the target track at the active address in the first storage is not a most current version of the data for the track maintained in the second storage.

22. The system of claim 16, further comprising:
in response to determining that the temporary checksum matches one of the at least one previous version checksum, performing:
   buffering the previous version address and the previous version checksum for the matching previous version checksum;
   setting a new previous version address and new previous version checksum to the active address and the active checksum values, respectively; and
   setting the active address and the active checksum to the buffered previous version address and the buffered previous version checksum, respectively.

* * * * *